(12) United States Patent
Aoki et al.

(10) Patent No.: US 7,836,312 B2
(45) Date of Patent: Nov. 16, 2010

(54) INFORMATION ACQUISITION ENABLED/DISABLED INSPECTION SYSTEM

(75) Inventors: Yoshinori Aoki, Yokohama (JP); Keitaroh Dohmen, Yamato (JP); Masayuki Numao, Kawasaki (JP); Yuji Watanabe, Yokohama (JP); Madoka Yuriyama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 10/570,298

(22) PCT Filed: Aug. 4, 2004

(86) PCT No.: PCT/JP2004/011149

§ 371 (c)(1),
(2), (4) Date: Feb. 27, 2006

(87) PCT Pub. No.: WO2005/022391

PCT Pub. Date: Mar. 10, 2005

(65) Prior Publication Data

US 2007/0005155 A1 Jan. 4, 2007

(30) Foreign Application Priority Data

Aug. 28, 2003 (JP) ............................. 2003-303908

(51) Int. Cl.
*G06F 21/24* (2006.01)
(52) U.S. Cl. ........................................ 713/193; 726/27
(58) Field of Classification Search .................. 700/55; 726/27; 707/9, 1; 713/193; 709/226
See application file for complete search history.

(56) References Cited

U.S. PATENT DOCUMENTS

| 5,235,642 | A  | * | 8/1993  | Wobber et al. ............... 713/156 |
| 6,178,422 | B1 |   | 1/2001  | Tada et al. |
| 6,647,388 | B2 |   | 11/2003 | Numao et al. |
| 2001/0023421 | A1 | * | 9/2001 | Numao et al. .................. 707/9 |
| 2002/0073072 | A1 |   | 6/2002 | Fukumoto |
| 2003/0018786 | A1 | * | 1/2003 | Lortz ......................... 709/226 |
| 2003/0046572 | A1 | * | 3/2003 | Newman et al. ............ 713/193 |
| 2003/0097383 | A1 | * | 5/2003 | Smirnov et al. ............. 707/204 |

(Continued)

FOREIGN PATENT DOCUMENTS

EP 0860763 A1 8/1998

(Continued)

OTHER PUBLICATIONS

PCT International Examination Report, Aug. 19, 2005, for International Application No. PCT/JP2004/011149.

(Continued)

*Primary Examiner*—Nasser Moazzami
*Assistant Examiner*—Travis Pogmore
(74) *Attorney, Agent, or Firm*—Janaki K. Davda; Konrad Raynes & Victor LLP (57) ABSTRACT

A technique for acquiring information. In response to receiving a request to read data stored in a database, said data is read from said database. In response to receiving a request to deliver particular data among said read data at a point in time when said particular data is to be used, it is determined whether said delivery request satisfies predetermined criteria. Said particular data is delivered in response to determining that said delivery request satisfies said predetermined criteria.

22 Claims, 5 Drawing Sheets

U.S. PATENT DOCUMENTS

2003/0135518 A1*  7/2003  Anglin et al. ............ 707/104.1

FOREIGN PATENT DOCUMENTS

| JP | 6348575 | A | 12/1994 |
| JP | 10-232878 | | 9/1998 |
| JP | 10232811 | A | 9/1998 |
| JP | 10232878 | A | 9/1998 |
| JP | 2001184264 | A | 7/2001 |
| JP | 2002-149652 | | 5/2002 |
| JP | 2002149652 | A | 5/2002 |
| JP | 2002-182983 | | 6/2002 |
| JP | 2002182983 | A | 6/2002 |

OTHER PUBLICATIONS

PCT International Search Report, Sep. 28, 2004, for International Application No. PCT/JP2004/011149.

Agrawal, R., J. Kiernan, R. Srikant, and Y. Xu, "Hippocratic Databases", Proceedings of the 28th VLDB Conference, Hong Kong, China, 2002, 12 pp.

English Abstract & Translation for JP10232811A, published Sep. 2, 1998, 15 pp.

English Abstract & Translation for JP2002182983A, published Jun. 28, 2002, 1 p.

English Abstract for JP10232878A, published Sep. 2, 1998, 1 p.

English Abstract & Translation for JP2002149652A, published May 24, 2002, 14 pp.

English Abstract & Translation for JP6348575A, published Dec. 22, 1994, 28 pp.

English Abstract for JP2001184264A, published Jul. 6, 2001, 1 p.

IDS Report, Jun. 11, 2010, from the May 25, 2010 Office Action for JP920030115JP2, 2 pp.

Japanese Office Action, May 25, 2010, for Application No. JP2005-513412, 3 pp.

Japanese Office Action, May 25, 2010, for Application No. JP2005-513412, 2 pp [Partial Translation].

Koutarou, "Starter for Server-Side Java from Scratch with Eclipse and Tomcat", WEB+DB Press, Japan, GijutsuHyohron Co., Ltd., May 10, 2003, vol. 14, pp. 48-54.

* cited by examiner

FIG. 1

| ID | Name | Address | TEL | Hobby | Department |
|---|---|---|---|---|---|
| 0001 | Taro Yamada | ..., Tokyo | 03-XXXX-XXXX | YYY | TDL |
| 0002 | Jiro Tanaka | ..., Kanagawa | 046-XXX-XXXX | YYY | ZZZ |
| 0003 | Hanako Sato | ..., Chiba | 090-XXXX-XXXX | YYY | TDL |
| ... | ... | ... | ... | ... | ... |

FIG. 2

| Group | PII type | Purpose of access | Condition |
|---|---|---|---|
| Tokyo-area sales personnel | Name, address, phone number | Sales activities | Only if address includes Tokyo |
| ... | ... | ... | ... |

FIG. 3

| SQL-ID | SQL statement template | Column to be protected | Data owner ID column |
|---|---|---|---|
| S001 | SELECT id, name, tel, hobby FROM pii_table WHERE department = "?" | 2(name), 3(tel) | 1(id) |
| S002 | ... | ... | ... |
| S003 | ... | ... | ... |
| ... | ... | ... | ... |

INFORMATION ACQUISITION ENABLED/DISABLED INSPECTION SYSTEM

RELATED APPLICATIONS

This application is a National Stage filing under 35 U.S.C. §371 of International Application No. PCT/JP2004/011149, filed on Aug. 4, 2004, which claims the benefit under 35 U.S.C. 365(b) of Japan Application No. 2003/303908, filed on Aug. 28, 2003, which is incorporated herein in its entirety by this reference.

TECHNICAL FIELD

The present invention relates to a database system having the capability of determining whether or not access by an application program (hereinafter referred to as an "application") to information stored in a database (hereinafter referred to as a "DB") satisfies predetermined criteria.

BACKGROUND

For sensitive information such as personal information, a criteria such as personal information protection policy (for example a P3P policy, hereinafter simply referred to as a "policy") may be established for the permission of disclosure of the information. If information stored in a DB is protected with such criteria, access from an application to the information is checked to see whether the access satisfies the criteria before the information can be provided to the application. The information is provided to the application only if the access satisfies the criteria. Conventionally, determination as to whether access satisfies criteria has been made at the point of time when information stored in a DB is physically accessed (for example see Non-patent literature 1).

Non-patent literature 1 describes a method for determining whether access to personal information complies with personal information protection policy. The specific procedure is as follows.

First, an application obtains a DB connection in a conventional manner and issues an SQL query to the DB. A logic for policy compliance is provided in the DB, where the SQL query is translated into a query compliant with a policy. That is, when the translated SQL query is executed, only the information that complies with the policy can be acquired as a result of the query. The result of the query is provided to the application as is, and personal information that does not comply with the policy is not provided to the application.

[Non-patent literature 1] Rakesh Agrawal, Jerry Kiernan, Ramakrishnan Srikant, Yirong Xu: "Hippocratic Databases," in proceedings of international Conference on Very Large Data Bases (VLDB) 2002: pp. 143-154, Springer, 2002

DISCLOSURE OF THE INVENTION

Problems to be Solved by the Invention

However, the technique described in Non-patent literature 1 requires that all items of information accessed be checked to determine whether the access complies with a policy before the result of the query can be provided to the application. For example, if access is attempted to 1,000 people's personal information, a policy compliance check for the 1,000 people must be performed before the result of the query can be provided to the application. Thus, the technique has the problem of slow response to DB access, since the application must wait until the policy compliance check on all of the personal information is completed.

Furthermore, the policy compliance checking may be performed on personal information that is not actually used by the application. For example, even though the application accesses 1,000 people's personal information, the application uses possibly only 100 people's information out of that information. This means that 900 people's personal information has been unnecessarily checked for compliance with the policy.

The present invention has been made in order to solve the technical problem described above and an object of the present invention is to efficiently determine whether or not access by an application to information stored in a DB satisfies predetermined criteria.

SUMMARY OF THE INVENTION

To achieve the object, according to the present invention, determination as to whether or not access by an application to information stored in a DB satisfies predetermined criteria is made at the point of time when a request to obtain the result of access is received from the application, rather than the time point at which the application physically accesses a record in the DB. That is, the database system according to the present invention includes: data storing means for storing data to be protected; data processing means for performing predetermine processing by using the data stored in the data storing means; and data protection means for, when receiving from the data processing means a request to read the data stored in the data storing means, reading the data from the data storing means and, when receiving from the data processing means a request to deliver particular data among the data, delivering the particular data to the data processing means if the delivery request satisfies predetermined criteria.

Furthermore, according to the present invention, determination as to whether or not access to information stored in a DB satisfies predetermined criteria is made by inquiring of a policy server, at the time point when the information is used. That is, a system of the present invention for checking whether or not information is permitted to be acquired includes a first computer using data stored in a DB and a second computer managing criteria for the use of the data, wherein: the first computer reads the data stored in the DB and, at the point of time when particular data among the data is used, sends information about the use of the particular data to the second computer; the second computer, when receiving the information about the use of the particular data, determines on the basis of the criteria whether or not the first computer is permitted to use the particular data, and returns the result of the determination to the first computer; and the first computer uses the data when receiving from the second computer information indicating that the first computer is permitted to use the particular data.

Furthermore, the present invention can be viewed as an information acquiring method for acquiring information from a DB. The method of the present invention for acquiring information includes the steps of: when receiving a request to read data stored in the DB from an application program, the reading data from a DB; when receiving a request to deliver particular data among the read data from the application program, determining whether or not the delivery request satisfies predetermined criteria; and delivering the particular data to the application program if it is determined that the delivery request satisfies the predetermined criteria.

In another aspect, the present invention can be viewed as a computer program for implementing functions for acquiring information from a DB. The program according to the present invention causes a computer to implement the functions of:

when receiving a request to read data stored in the DB from an application program, the reading data from a DB; when receiving a request to deliver particular data among the read data from the application program, determining whether or not the delivery request satisfies predetermined criteria; and delivering the particular data to the application program if it is determined that the delivery request satisfies the predetermined criteria.

Advantages of the Invention

According to the present invention, determination can be efficiently made as to whether or not access by an application to information stored in a DB satisfies predetermined criteria.

PREFERRED EMBODIMENT

An embodiment of the present invention will be described below in detail with reference to the accompanying drawings. It is assumed in the present embodiment that "personal information" is information to be protected and "personal information protection policy" is criteria that access must satisfy.

Focusing attention on the fact that the timing at which access to personal information in a DB is made differ from the timing at which that personal information is used by the application, the present invention solves the problem by performing a policy compliance check at the latter timing (delayed evaluation).

In particular, instead of checking all personal information for compliance with a policy before returning the result of a query to an application, a "controlled query result", which has the function of policy compliance checking, is returned to the application. The application requests personal information from the "controlled query result" at the point of time when the application actually uses the personal information. The "controlled query result" performs a policy compliance check at this point of time and returns the requested personal information depending on the result of the check.

Figure 1:
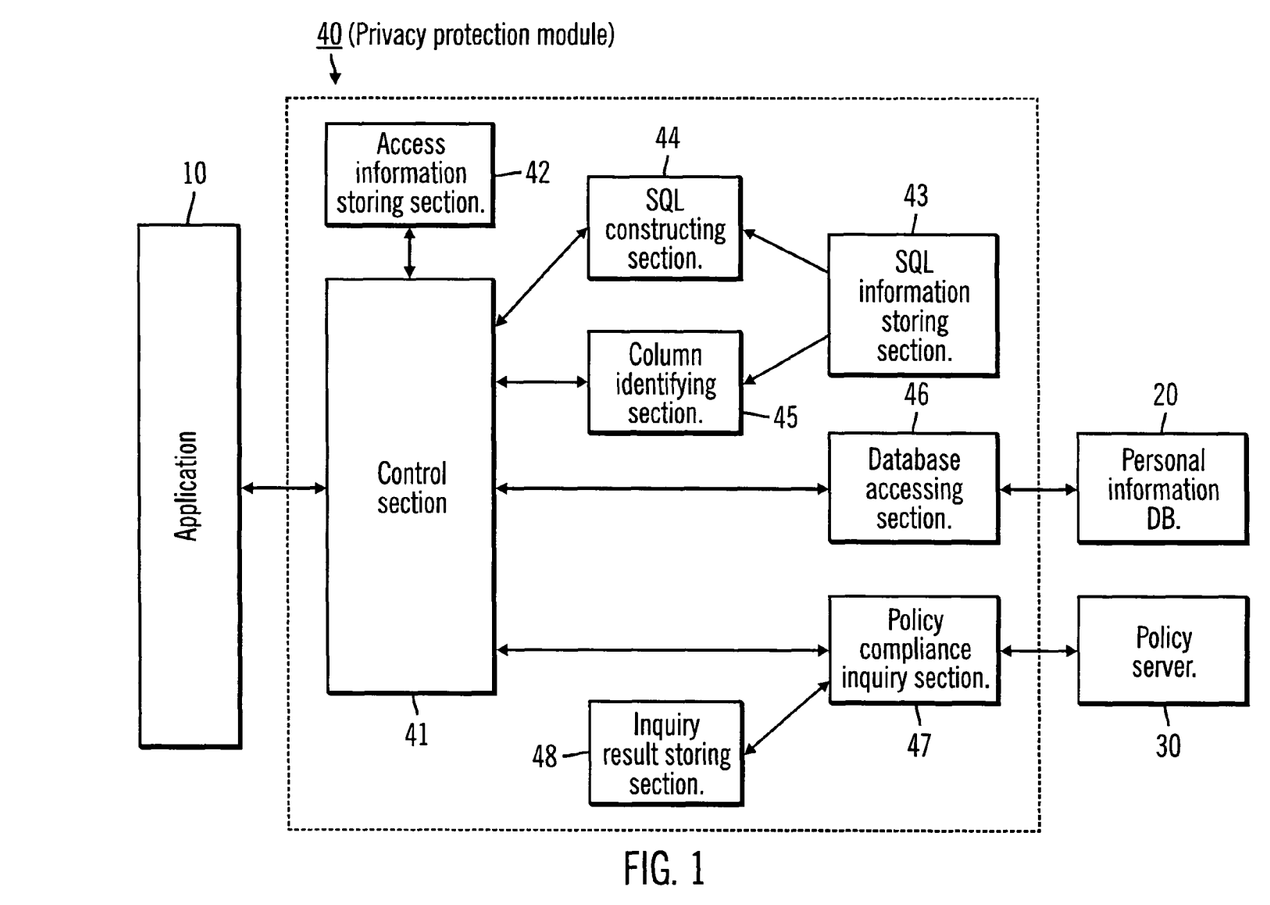
FIG. 1 is a block diagram showing an overall configuration of a database system according to the present embodiment.

FIG. 1 shows an overall configuration of a database system according to the present embodiment.

As shown in FIG. 1, the database system includes an application 10, a personal information DB 20, a policy server 30, and a privacy protection module 40.

The application 10 is a program that uses personal information stored in the personal information DB 20 to perform various kinds of processing. For example, the application may be a program that searches the personal information DB 20 for personal information and displays the result on a display.

Figure 2:
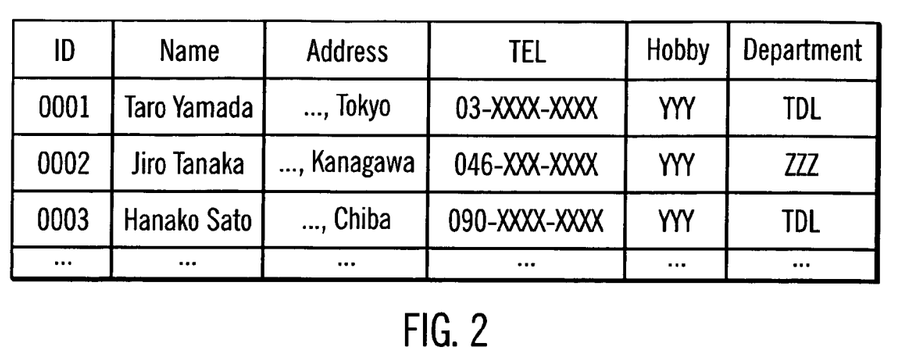
FIG. 2 shows an example of information stored in a personal information DB according to the present embodiment.

The personal information DB 20 is a DB that stores personal information. For example, data as shown in FIG. 2 is stored in the personal information DB 20.

Figure 3:
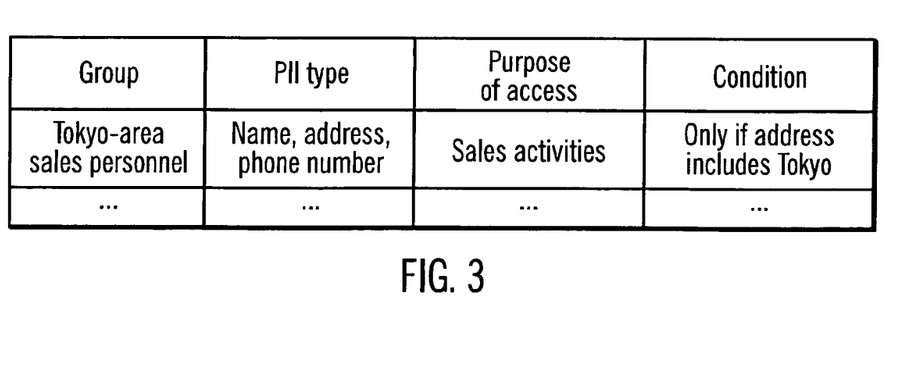
FIG. 3 shows an example of information managed in a policy server according to the present embodiment.

The policy server 30 is a server that manages personal information protection policies and, in response to a policy compliance check request, performs a policy compliance check on the basis of a personal information protection policy and returns the result of the check. The policy server 30 manages personal information protection policies such as the one shown in FIG. 3, for example. The table in FIG. 3 is used for policy compliance checking based on a P3P policy. Specifically, it shows that Tokyo-area sales personnel can access the names, addresses, and phone numbers of people whose addresses contain Tokyo, for the purpose of sales activities only.

The privacy protection module 40 is a program that retrieves personal information stored in the personal information DB 20 upon reception of a request for retrieval of the personal information from the application 10, and requests the policy server 30 to perform a policy compliance check upon reception of a request for delivery of a particular subset of the retrieved personal information, and provides the particular personal information to the application 10 only if a response indicating that the request complies with the policy is returned. While the privacy protection module 40 is provided separately from the application 10 in FIG. 1, it may be a module that functions as an integral part of the application 10.

The privacy protection module 40 includes a control section 41, an access information storing section 42, an SQL information storing section 43, an SQL constructing section 44, a column identifying section 45, a database accessing section 46, a policy compliance inquiry section 47, and a inquiry result storing section 48.

The control section 41 serves as an interface with the application 10 and controls overall flows. For example, the control section 41 acts as an application's-interface flow-control-logic in the privacy protection module 40. The application 10 can access the personal information DB 20 only through the control section 41.

The access information storing section 42 stores information required for accessing the personal information DB 20 (hereinafter referred to as "access information"). Examples of the access information include user IDs and passwords required for accessing the personal information DB 20. The privacy protection module 40 manages these items of information to control access by the application 10 to the personal information DB 20.

The SQL information storing section 43 stores information concerning SQL statements that can be issued to the personal information DB 20 (hereinafter referred to as "SQL information") without causing problems. If the application 10 were allowed to construct SQL statements on its own and issue them to the personal information DB 20, the application 10 could issue SQL statements that destroy information stored in the personal information DB 20. To prevent this, the privacy protection module 40 manages information required for constructing SQL statements that can be issued to the personal information DB 20 without problems. If all SQL statements that can be issued to the personal information DB 20 without problems were to be provided in the SQL information storing section 43, the number of the SQL statements would be enormous. Therefore, SQL statement templates containing variables that can be replaced with input parameters (hereinafter referred to as "SQL statement templates") are managed.

Figure 4:
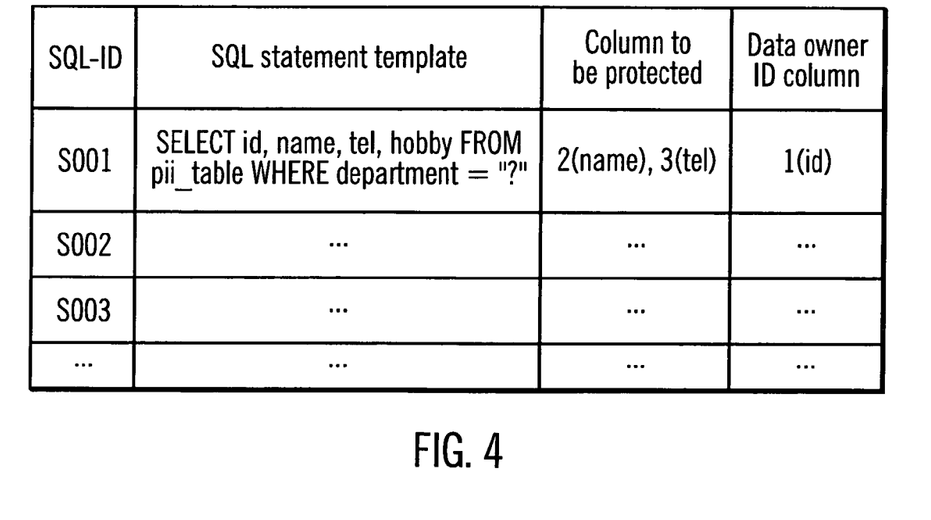
FIG. 4 shows an example of information stored in an SQL information storing section according to the present embodiment.

FIG. 4 shows an example of information stored in the SQL information storing section 43. In FIG. 4, an SQL-ID, which is identification information that uniquely identifies each SQL statement template is assigned to the SQL statement template.

Also in FIG. 4, protected column information and data owner ID column information are associated with each SQL statement template. Here, the protected column information is information for identifying a column that is specified as a column to be protected among the columns retrieved by using an SQL statement constructed from an SQL statement template. The data owner ID column information is information for identifying a column that is to be referenced in order to know the owner of each item of data among the columns retrieved by using an SQL statement constructed from an SQL statement template.

The SQL constructing section 44 is a section that retrieves one of the SQL statement templates stored in the SQL information storing section 43 that is associated with an SQL-ID input by the application 10 and embeds parameters input by the application 10 in variables to construct an SQL statement. The SQL constructing section 44 is equivalent to an SQL construction logic, for example, in the privacy protection module 40.

The column identifying section 45 is a section that identifies, on the basis of information stored in the SQL information storing section 43, a protected column and data owner ID column associated with an SQL-ID input by the application 10. The column identifying section 45 is equivalent to a column identifying logic, for example, in the privacy protection module 40.

The database accessing section 46 is a section that accesses the DB and holds the result of the access. For example, it is equivalent to a DB connection which is a typical Java® class for accessing a DB. (Java® and all Java®-related trademarks and logos are trademarks or registered trademarks of Sun Microsystems, Inc. in the United States and other countries.)

The policy compliance inquiry section 47 is a section that issues an inquiry about policy compliance to the policy server 30 and receives and returns the result of the inquiry. In particular, the policy compliance inquiry section 47 is equivalent to a policy compliance inquiry logic in the privacy protection module 40.

The inquiry result storing section 48 is provided for reducing costs for communicating with the policy server 30 and the load placed by policy compliance checks. The inquiry result storing section 48 serves as a cache memory for storing the results of inquires issued to the policy server 30.

A hardware configuration of a typical computer system can be used as the hardware configuration of the database system in the present embodiment. In particular, any of the computer that executes the application 10, the computer that manages the personal information DB 20, the policy server 30, and the computer that executes the privacy protection module 40 may be a computer that includes a central processing unit (CPU) and a main memory, which are connected to an external storage through a bus. The external storage may be a storage such as a hard disk, a flexible disk, an MO (Magneto-Optical disk), or CD-ROM, for example.

In the computer that executes the application 10, the application 10 is stored in an external storage and is loaded and executed by the central processing unit (CPU) in the main memory to implement data processing means, not shown.

In the computer that manages the personal information DB 20, an external storage implements the personal information DB 20. The personal information DB 20 can be typically considered as data storage means.

In the policy server 30, a computer program for performing policy compliance checking is stored in an external storage and the central processing unit (CPU) loads the computer program into the main memory to implement the functionality of policy compliance checking. Policies referenced in policy compliance checking may be contained in the computer program or may be stored in an external storage separately from the computer program.

In the computer that executes the privacy protection module 40, the privacy protection module 40 is stored in an external storage and is loaded and executed by the central processing unit (CPU) in the main memory to implement privacy protection means, not shown. The control section 41, access information storing section 42, SQL information storing section 43, SQL constructing section 44, column identifying section 45, database accessing section 46, policy compliance inquiry section 47, and inquiry result storing section 48 as program logics contained in the privacy protection module 40 implement the control section 41, access information storing section 42, SQL information storing section 43, SQL constructing section 44, column identifying section 45, database accessing section 46, policy compliance inquiry section 47, and inquiry result storing section 48, respectively, as functions of the computer.

The computer that executes the privacy protection module 40 may execute the application 10 or may manage the personal information DB 20. Furthermore, the policy compliance checking function of the policy server 30 may be included in the policy compliance inquiry section 47 of the privacy protection module 40 or may be included as a separate program running on the computer that executes the privacy protection module 40. It should be noted that if the policy compliance checking function is implemented by the policy server 30, which is an independent server computer, modification to policies can be flexibly addressed.

Furthermore, each computer in the database system according to the present embodiment may have input devices such as a keyboard and a pointing device connected to it or have an output device such as a display connected to it.

Operation of the database system according to the present embodiment will be described below. In the following description of operation, the terms control section 41, access information storing section 42 SQL information storing section 43, SQL constructing section 44, column identifying section 45, database accessing section 46, policy compliance inquiry section 47, and inquiry result storing section 48 refer to components as functions of a computer.

Figure 5:
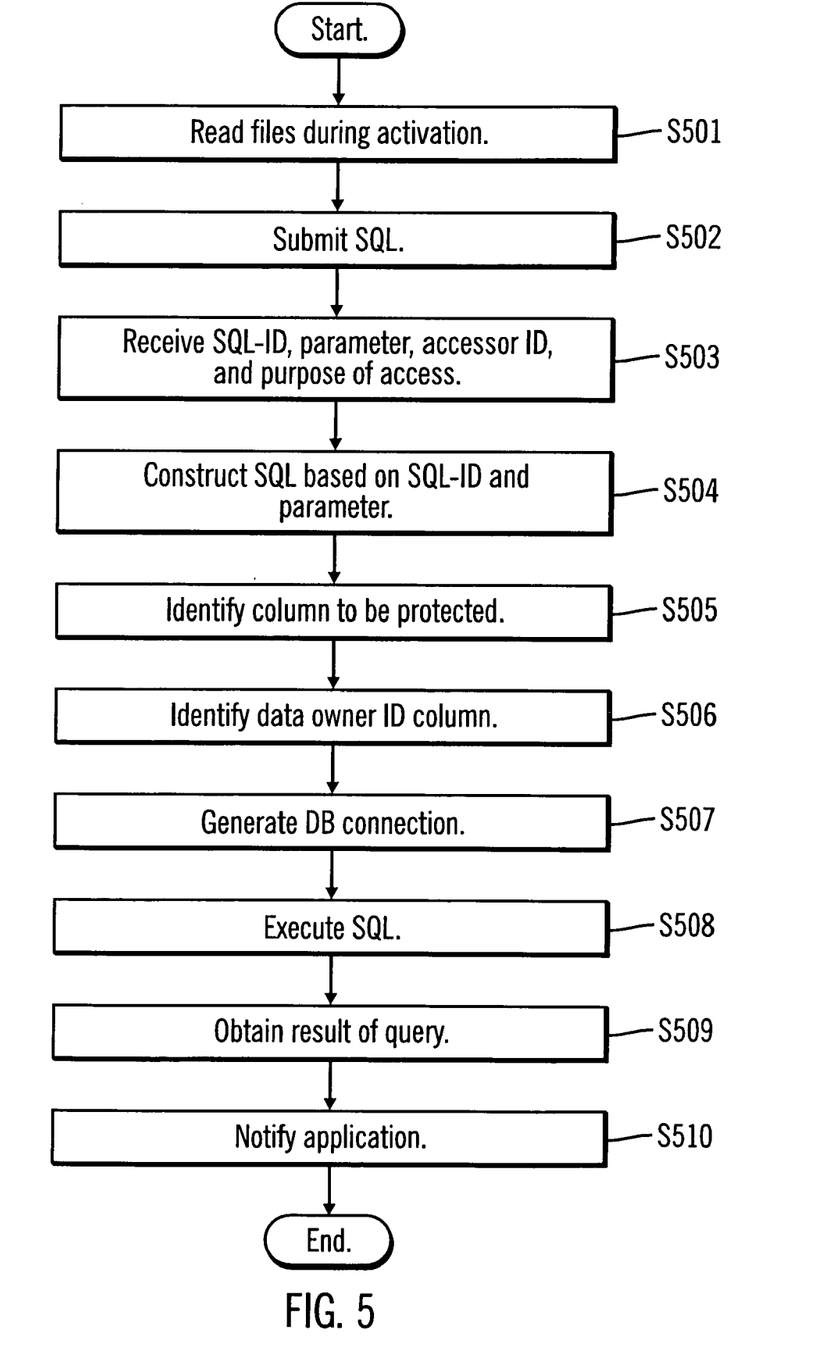
FIG. 5 is a flowchart showing an operation performed when a privacy protection module according to the present embodiment is executed.

FIG. 5 is a flow chart of operation performed by the privacy protection module 40 for retrieving data from the personal information DB 20 in response to a request from the application 10.

First, the privacy protection module 40 reads files used for the subsequent process (step 501). In particular, the privacy protection module 40 reads access information stored in an external storage into an area in the main memory that is managed by the access information storing section 42 and reads SQL information stored in the external storage into an area in the main memory that is managed by the SQL information storing section 43.

Then, the control section 41 in the privacy protection module 40 provides the SQL information read at step 501 to the application 10 in order to construct an SQL statement that can be issued to the personal information DB 20 without causing a problem (step 502). In response to this, the application 10 displays the association between SQL-IDs and SQL statement templates on a display to prompt a user to select an SQL statement to be submitted to the personal information DB 20.

When the user responds to this by inputting the SQL-ID of an SQL statement template from which an SQL statement the user wants to issue to the personal information DB 20 is constructed, parameters to be embedded in variables in the SQL statement template, and the purpose of the access, the application 10 provides the input SQL-ID, parameters, and purpose of the access to the privacy protection module 40. The application 10 also identifies the accessing user by means of information such as a user ID input during login to the application 10, and provides an accessor ID to the privacy protection module 40.

In the privacy protection module 40, the control section 41 receives these items of information (step 503) and provides the SQL-ID and parameters to the SQL constructing section 44.

Typically, SQL information is provided to an application 10 developer and the developer develops the application 10 on the basis of the SQL information. In that case, the application 10 can input the SQL-ID and the step 502 of providing SQL information can be omitted. According to such typical implementation, the privacy protection module 40 receives the SQL-ID and parameters from the application 10 and, if the SQL-ID is invalid (for example if a nonexistent SQL-ID is specified), returns an error to the application 10. Only if the SQL-ID is valid, the privacy protection module 40 performs the following process.

The SQL constructing section 44 retrieves the SQL statement template associated with the provided SQL-ID from the SQL information storing section 43 and embeds the provided parameters in the SQL statement template to construct an SQL statement to be issued to the personal information DB 20 (step 504), and then returns it to the control section 41.

For example, if the SQL-ID "S001" and parameter "TDL" are provided, then the SQL constructing section 44 generates the SQL statement "SELECT id, name, tel, hobby FROM pii_table WHERE department="TDL"".

The control section 41 also provides the SQL-ID to the column identifying section 45.

The column identifying section 45 refers to the SQL information storing section 43 to identify a column to be protected among the columns retrieved by using the SQL statement associated with the SQL-ID provided (step 505). For example, when the SQL statement associated with the SQL-ID "S001" is issued, the columns "id", "name", "tel", and "hobby" are returned. The column identifying section 45 refers to the SQL information storing section 43 and knows that the columns "name" and "tel" among those columns are columns to be protected and therefore notifies the control section 41 that these columns are columns to be protected.

The column identifying section 45 refers to the SQL information storing section 43 to identify a column indicating the data owner ID in the columns retrieved by using the SQL statement associated with the provided SQL-ID (step 506). For example, for the SQL statement associated with the SQL-ID "S001", the columns "id", "name", "tel", and "hobby" are returned. By referring to the SQL information storing section 43, the column identifying section 45 can know that the column "id" is the ID column of the data owner and therefore indicates this to the control section 41.

As a result of the process described above, the control section 41 holds information for determining whether a request for delivery of the retrieved data complies with a personal information protection policy, in addition to the access information required for accessing the personal information DB 20 and the SQL statement to be issued to the personal information DB 20.

In particular, information indicating "who" accesses "whose information" and "what kind of information" for "what purpose" is required in order to protect personal information. Among these items of information, information indicating "who" accesses and for "what purpose" has been provided to the control section 41 at step 503. Information indicating "whose information" is accessed will be specified by the application 10 as will be described later with reference to the flowchart in FIG. 6. Data owner ID column information used for determining whether or not the access to that person's information complies with the policy has been provided to the control section 41 at step 506. In addition, "what kind of information" is accessed will also be specified by the application 10 as will be described later. Protected-column information used for determining whether or not the access to that information complies with the policy has been provided to the control section 41 at step 505.

Then, the control section 41 generates database accessing section 46 (DB connection) (step 507) and provides the held access information and SQL statement to the database accessing section 46 to instruct it to access the personal information DB 20. In response to this instruction, the database accessing section 46 uses the access information to access the personal information DB 20 and issues the SQL statement (step 508). Access from the application 10 to the personal information DB 20 is available only through the privacy protection module 40. Thus, classes relating to database access are wrapped by the privacy protection module 40, thereby preventing access by the application 10 to the personal information DB 20 without restraint.

Then, the database accessing section 46 obtains the result of the query and holds it (step 509).

If the SQL statement "SELECT id, name, tel, hobby FROM pii_table WHERE department="TDL", for example, is issued to the personal information DB 20, then the "ID", "name", "TEL" and "hobby" in the information of people whose "department" is "TDL" are obtained. In particular, items of information such as "0001, Taro Yamada, 03-xxxx-xxxx, yyy" and "0003, Hanako Sato, 090-xxxx-xxxx, YYY" are retrieved in the example shown in FIG. 2.

Then, the database accessing section 46 notifies the control section 41 that it has obtained the result of the query, and the control section 41 then notifies it to the application 10 (step 510).

In Java®, information in a DB can be acquired by specifying the ordinal number of the record and the ordinal number of the column containing the information to be acquired and receiving the information from a class (ResultSet) that holds the result of a query. Therefore, the notified application 10 specifies a record and column to actually use, thereby requesting the privacy protection module 40 to deliver the data.

In particular, if the application 10 is a program that lists "name" information in the personal information included in the result of a query in order, the application 10 requests "name" information in the first record by the first delivery request and requests "name" information in the second record by the second delivery request. It repeats such a request until the user inputs an instruction to stop the listing of the information. The user may input an instruction to stop display before issuing requests for all information if the user find desired information in 50 people's information displayed on a display screen capable of displaying up to 50 people's information at a time.

Figure 6:
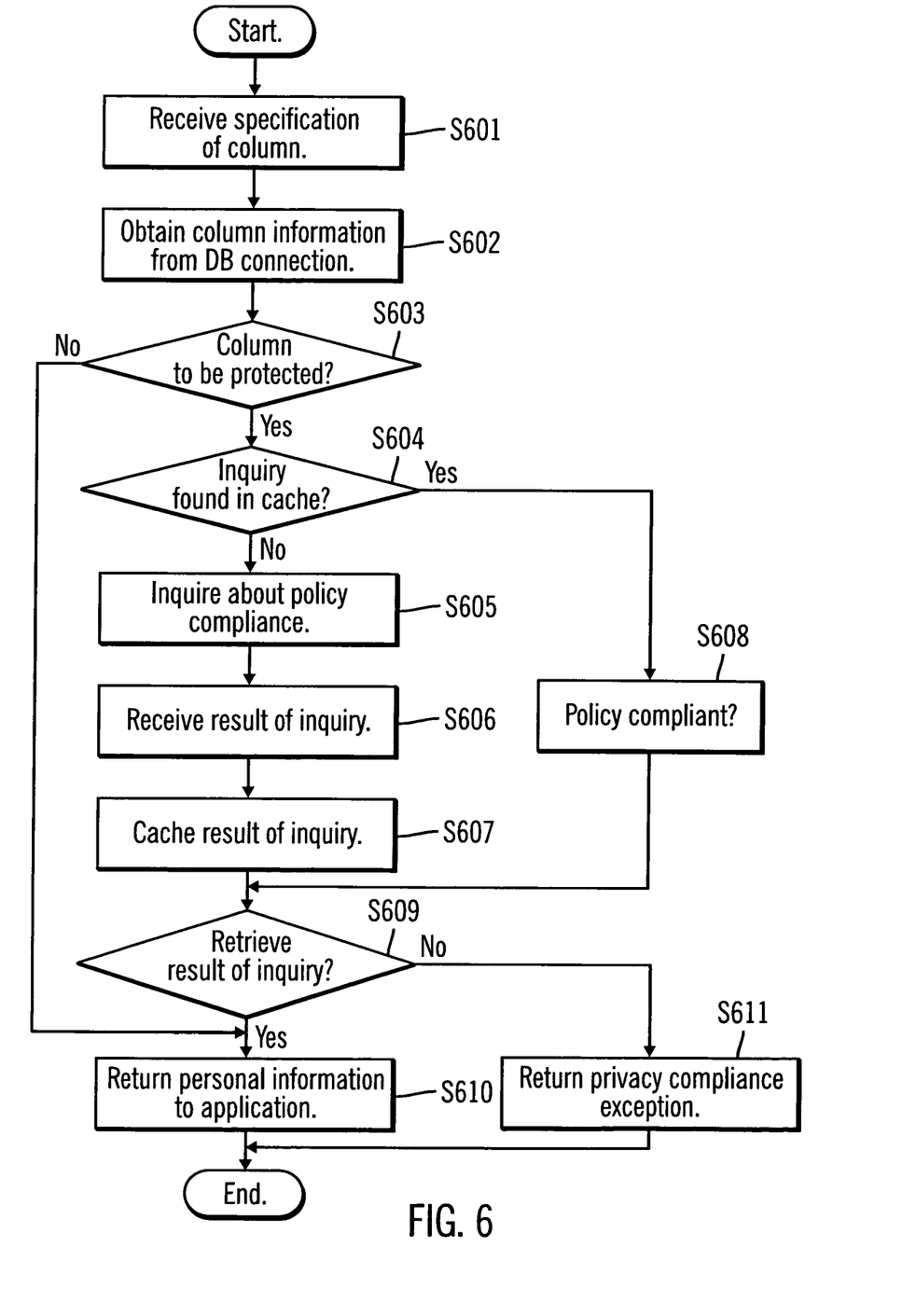
FIG. 6 is a flowchart showing an operation performed when the privacy protection module according to the present embodiment is executed.

Operation performed by the privacy protection module 40 for delivering data retrieved from the personal information DB 20 in response to a delivery request from the application 10 will be described below.

FIG. 6 is a flowchart of the operation. As described above, after the application 10 is notified of the acquisition of the result of the query at step 510, the application 10 requests the privacy protection module 40 to deliver the data, item by item. Operation of the privacy protection module 40 performed in response to one request from the application 10 for delivery of one particular item of data will be described here.

In the privacy protection module 40, the control section 41 first receives the specification of a record and column from the application 10 (step 601).

In response to this, the control section 41 acquires the information in the specified record in the specified column from the result of the query held by the database accessing section 46 (step 602).

For example, if the query result acquired at step 509 is "0001, Taro Yamada, 03-XXXX-XXXX, YYY", "0003, Hanako Sato, 090-XXXX-XXXX, YYY", and so on, and the application 10 requests the information in the first record in the second column ("name"), then the control section 41 retrieves the information "Taro Yamada".

Then, the control section 41 determines based on the protected column information identified at step 505 whether the requested column is to be protected (step 603).

If the column requested is not a column to be protected, then the control section 41 returns the acquired information to the application 10 as is (step 610). For example, if the columns "name" and "TEL" are specified as columns to be protected and the column "hobby" is requested, the control section 41 returns the retrieved information to the application 10 as is, because that column is not a column to be protected.

On the other hand, if the requested column is to be protected, control is passed to the policy compliance inquiry section 47, which then determines whether an inquiry result is already stored in the inquiry result storing section 48 (step 604). If the inquiry result is stored in the inquiry result storing section 48, then the policy compliance inquiry section 47 retrieves the inquiry result from the inquiry result storing section 48 (step 608); otherwise, the policy compliance inquiry section 47 inquires of the policy server 30 about the policy compliance (step 605). For example, the columns "name" and "TEL" are specified as columns to be protected and the column "name" is requested, the policy sever 30 performs such policy compliance checking because the column "name" is a column to be protected.

Then, the policy server 30 performs policy compliance checking and returns the result to the policy compliance inquiry section 47. The policy compliance inquiry section 47 receives the result of the inquiry and returns it to the control section 41 (step 606) and, at the same time, caches it in the inquiry result storing section 48 (step 607).

Specifically, the following process is performed. The assumption here is that the control section 41 holds the accessor ID "E0001" (Tokyo-area sales personnel) and the purpose of the access "sales activity" as a result of the processing at step 503, and also holds information indicating that the columns "name" and "tel" are columns to be protected as a result of the processing at step 505, and holds information indicating that the column "id" is the data owner ID column as a result of the processing at step 506. It is also assumed that the following query result has been obtained at step 509: "0001, Taro Yamada, 03-XXXX-XXXX, YYY" in the first record and "0003, Hanako Sato, 090-XXXX-XXXX, YYY in the second record. The policy server 30 holds the personal information protection policy shown in FIG. 3, which defines the condition "Only if address includes Tokyo". It is assumed that the policy compliance inquiry section 47 therefore knows that it should send address information when requesting policy compliance checking. It is also assumed here that the inquiry result storing section 48 does not hold the result of check on compliance with this policy.

Suppose that delivery of the second column in the first record included in the result of the query is requested by the application 10 in the situation described above. The control section 41 then provides to the policy server 30 through the policy compliance inquiry section 47 the accessor ID "E0001" as the information indicating "who" is accessing, the purpose of access "For sales activities" as the information indicating "what purpose", the data owner ID "S0001" as the information indicating "whose information", and the column "name" as the information indicating "what kind of information". It also provides "Tokyo" as the address of the data owner to the policy server 30. In response to this, the policy server 30 returns "OK" as the result of the compliance check, because "E0001", which indicates "Tokyo-area sales personnel", is requesting delivery of the "name" of "S001" whose "address includes Tokyo" for the purpose of "sales activities" and hence the request complies with the policy in FIG. 3.

On the other hand, suppose that delivery of the second column in the second record in the result of the query is requested by the application 10. Then, the control section 41 provides to the policy server through the policy compliance inquiry section 47 the accessor ID "E0001" as the information indicating "who" is accessing, the purpose of access "for sales activities" as the information indicating "what purpose", the data owner ID "S0003" as the information indicating "whose information", and the column "name" as the information indicating "what kind of information". It also provides "Chiba" as the address of the data owner to the policy server 30. In response to this, the policy server 30 returns "NG" as the result of the compliance check, because "E0001", which indicates "Tokyo-area sales personnel", is requesting delivery of the "name" of "S003" whose "address includes Chiba" for the purpose of "sales activities" and hence the request does not comply with the policy in FIG. 3.

While the address of the data owner is sent from the policy compliance inquiry section 47 to the policy server 30 in the specific example, the data owner ID alone may be sent for the policy compliance check if the policy server 30 holds the address of each individual owner.

If the request complies with the policy (YES at step 609), then the control section 41 returns the personal information acquired at step 602 to the application 10 (step 610). On the other hand, if the request does not comply with the policy (NO at step 609), then the control section 41 does not return the personal information acquired at step 602 to the application 10 but returns an error message, for example, "Privacy Violation!", indicating a privacy compliance exception to the application 10 (step 611).

Thus, the operation according to the present embodiment ends.

If the present embodiment is implemented in Java®, a class that wraps an object, "java®.sql.ResultSet", for holding the result of a query is created and a logic that performs a policy compliance check is implemented in the wrap class. Furthermore, java®.sql.ResultSet can be used as the interface for the wrap class to enable the application 10 to access privacy-protected personal information in exactly the same way as using a normal ResultSet.

While in the foregoing description SQL statement templates used as a basis for constructing SQL statements to be issued to the personal information DB 20 are provided as shown in FIG. 4 such that input parameters can be embedded, SQL statements themselves may be provided so that they can be presented through the application 10 if the number of SQL statement patterns used are small.

While a column to be protected and data owner ID column are identified at steps 505 and 506, respectively, by using SQL information as shown in FIG. 4 in the present embodiment, the present invention is not so limited. That is, a column to be protected may be identified at any point of time before step 603 and may be identified based on any information. Also, the data owner ID column may be identified at any point of time before step 605 and may be identified based on any information.

Load concentration during access to a database can be prevented according to the present embodiment because information stored in the database is checked for compliance with a policy at the time when an application uses the information, as has been described above. For example, if an application is designed to display 50 people's information out of the information retrieved from a personal information DB on a display at a time, only the 50 people's information needs to be checked for compliance with a policy at a time.

Furthermore, unnecessary policy compliance checks can be avoided because a policy compliance check is performed at the time when the application uses information stored in the DB. For example, intended processing may be completed in effect after 50 people's information is scanned among 1,000 people's information that has been hit. In such a case, the benefits of avoiding unnecessary policy compliance checks is significant.

According to the conventional techniques, a special database must be provided that has a mechanism for transforming an SQL query received into an SQL for acquiring only the information that complies with a policy as the result of the query. In contrast, the present embodiment does not require such a special database.

Furthermore, according to the conventional techniques, an extended SQL must be used for a policy compliance check if information such as who accesses information for what purpose is used. According to the present embodiment, in contrast, an extended SQL does not need to be used because such information is addressed in the privacy protection module.

DESCRIPTION OF SYMBOLS

10 . . . Application
20 . . . Personal information DB
30 . . . Policy server
40 . . . Privacy protection module
41 . . . Control section
42 . . . Access information storing section
43 . . . SQL information storing section
44 . . . SQL constructing section
45 . . . Column identifying section
46 . . . Database accessing section
47 . . . Policy compliance inquiry section
48 . . . Inquiry result storing section

The invention claimed is:

1. A database system comprising:
data storing means for storing data to be protected;
data processing means for performing predetermined processing by using said data stored in said data storing means; and
data protection means for,
at a first point in time, receiving a first request to read said data stored in said data storing means from said data processing means by receiving from a user a selection of a statement template for reading said data and a purpose of the access,
receiving from said data processing means a user identifier of the user,
in response to receiving said selection of said statement template, said purpose, and said user identifier of the user, reading said data from said data storing means without determining whether said data satisfies predetermined criteria,
holding said read data without returning said data to said data processing means in response to said first request,
notifying said data processing means that said data has been read,
at a later point in time point when said particular data is to be used by said data processing means, receiving from said data processing means a second request to deliver particular data among said held data, wherein said request specifies a record and a column, and
in response to receiving said second request, using said held data,
determining whether said column is to be protected by accessing stored information associated with said statement template,
in response to determining that said column is to protected, determining whether said delivery request satisfies predetermined criteria based on the purpose of the access, the user identifier, and information about an owner of said particular data, and
delivering said particular data to said data processing means on condition that said delivery request satisfies said predetermined criteria.

2. The database system according to claim 1, wherein said data processing means accesses said data storing means through said data protection means; and
said data protection means holds access information for accessing said data storing means and, said data protection means holds access information for accessing said data storing means and, on reading said data from said data storing means, uses said access information to access said data storing means.

3. The database system according to claim 1, wherein said data protection means holds a plurality of database manipulation statements for reading said data stored in said data storing means and, in response to receiving a selection of a particular database manipulation statement from among said plurality of database manipulation statements as a request to read said data, uses said particular database manipulation statement to read said data from said data storing means.

4. The database system according to claim 1, wherein said data protection means holds said plurality of statement templates for reading said data stored in said data storing means and, in response to receiving a selection of a particular one of said plurality of statement templates and an input of a parameter as a request to read said data, constructs a database manipulation statement on the basis of said particular statement template and said parameter and uses said database manipulation statement to read said data from said data storing means.

5. The database system according to claim 1, wherein:
said data protection means, in response to receiving from said data processing means a request to deliver said particular data, identifies the owner of said particular data.

6. The database system according to claim 1, wherein:
said data protection means, in response to receiving from said data processing means a request to deliver said particular data, sends information about said delivery request to another computer managing criteria for determining whether said particular data is permitted to be delivered to said data processing means and determines on the basis of a response from said another computer whether said delivery request satisfies said criteria.

7. The database system according to claim 1, wherein, said data protection means returns to said data processing means a response indicating that said delivery request does not satisfy said predetermined criteria on condition that said delivery request does not satisfy said predetermined criteria.

8. A system comprising a first computer using data stored in a database and a second computer managing criteria for the use of said data, wherein:
said first computer, in response to receiving a first request to read said data stored in said database from an application program at a first point in time reads said data stored in said database without determining whether said particular data is permitted to be delivered to said application program and holds said data without returning said data to said application program in response to said first request, and, in response to receiving from said application program a second request to deliver particular data among said data at a later point in time when said particular data among said data is used by said application to display said data, sends information about the use of said particular data to said second computer, wherein said request specifies a record and a column;
said second computer, in response to receiving said information about the use of said particular data,
determines on the basis of said criteria whether said first computer is permitted to use said particular data by:
determining whether said column is to be protected by accessing stored information associated a statement template, and
in response to determining that said column is to protected, determining on the basis of said criteria, a purpose of an access of said particular data, a user identifier, and information about an owner of said particular data whether said particular data is permitted to be delivered to said application program, and returns a result of the determination to said first computer; and
said first computer uses said particular data in response to receiving from said second computer information indicating that said first computer is permitted to use said particular data.

9. The system according to claim 8, wherein:
said first computer delivers said particular data to said application program depending on the result returned from said second computer.

10. A method for acquiring information, comprising:
at a first point in time, receiving a first request from an application to read said data stored in a database by receiving from a user a selection of a statement template for reading said data and a purpose of the access;
receiving from said application a user identifier of the user;
in response to receiving said selection of said statement template, said purpose, and said user identifier of the user, reading said data from said database without determining whether said data satisfies predetermined criteria;
holding said read data without returning said data to said data processing means in response to said first request;
notifying said application that said data has been read;
at a later point in time point when said particular data is to be used by said application, receiving from said application a second request to deliver particular data among said held data, wherein said request specifies a record and a column; and in response to receiving said second request, using said held data
determining whether said column is to be protected by accessing stored information associated with said statement template;
in response to determining that said column is to protected, determining whether said delivery request satisfies predetermined criteria based on the purpose of the access, the user identifier, and information about an owner of said particular data; and
delivering said particular data to said application on condition that said delivery request satisfies said predetermined criteria.

11. The method for acquiring information according to claim 10, wherein reading said data from said database further comprises:
reading access information for accessing said database; and
accessing said database by using said read access information.

12. The method for acquiring information according to claim 10, wherein reading said data from said database further comprises:
reading a particular database manipulation statement from among a plurality of database manipulation statements for reading said data stored in said database; and
reading said data from said database by using said selected particular database manipulation statement.

13. The method for acquiring information according to claim 10, wherein reading said data from said database further comprises:
holding a plurality of statement templates;
receiving selection of a particular statement template from among said plurality of statement templates and input of a parameter as a request to read said data;
receiving an input of a parameter; and
constructing a database manipulation statement on the basis of said selected statement template and said input parameter and reading said data from said database by using said database manipulation statement.

14. The method for acquiring information according to claim 10, wherein determining whether said delivery request to satisfies predetermined criteria further comprises:
in response to receiving said request to deliver said particular data, sending information about said delivery request to another computer managing criteria for determining whether said particular data is permitted to be delivered; and
determining on the basis of a response from said another computer whether said delivery request satisfies said criteria.

15. A program loaded into main memory by a Central Processing Unit (CPU) for causing a computer to implement the functions of:
at a first point in time, receiving a first request from an application to read said data stored in a database by receiving from a user a selection of a statement template for reading said data and a purpose of the access,
receiving from said application a user identifier of the user;
in response to receiving said selection of said statement template, said purpose, and said user identifier of the user, reading said data from said database without determining whether said data satisfies predetermined criteria;
holding said read data
notifying said application that said data has been read;

at a later point in time point when said particular data is to be used by said application, receiving from said application a second request to deliver particular data among said held data, wherein said request specifies a record and a column; and in response to receiving said second request, using said held data, determining whether said column is to be protected by accessing stored information associated with said statement template;

in response to determining that said column is to protected, determining whether said delivery request satisfies predetermined criteria based on the purpose of the access, the user identifier, and information about an owner of said particular data; and delivering said particular data on condition that said delivery request satisfies said predetermined criteria.

16. The program according to claim 15 for further causing the computer to implement the functions of:

holding access information for accessing said database; and accessing said database by using said access information on reading said data from said database.

17. The program according to claim 15 for further causing the computer to implement the functions of:

holding a plurality of database manipulation statements for reading said data stored in said database;

prompting selection of a particular database manipulation statement from among said plurality of database manipulation statements as a request to read said data; and reading said data from said database by using said selected particular database manipulation statement.

18. The program according to claim 15 for further causing the computer to implementing the functions of:

holding a plurality of statement templates;

receiving selection of a particular statement template from among said plurality of statement templates and input of a parameter as a request to read said data;

receiving an input of a parameter; and constructing a database manipulation statement on the basis of said selected statement template and said input parameter and reading said data from said database by using said database manipulation statement.

19. The program according to claim 15 for further causing the computer to implement the function of:

in response to receiving a request to deliver said particular data, identifying the owner of said particular data.

20. The program according to claim 15 for implementing, in said function of determining whether said delivery request satisfies said predetermined criteria, the functions of:

in response to receiving a request to deliver said particular data, sending information about said delivery request to another computer managing criteria for determining whether said particular data is permitted to be delivered; and determining on the basis of a response from said another computer whether said delivery request satisfies said criteria.

21. The program according to claim 15 for further causing the computer to implement the function of:

if said delivery request does not satisfy said predetermined criteria, returning a response indicating that said delivery request does not satisfy said predetermined criteria.

22. The method for acquiring information according to claim 10, wherein said predetermined criteria is specified by a privacy protection policy.

\* \* \* \* \*